United States Patent
Apostolopoulos

(10) Patent No.: US 6,678,329 B2
(45) Date of Patent: Jan. 13, 2004

(54) CLIENT-ASSISTED MOTION ESTIMATION FOR CLIENT-SERVER VIDEO COMMUNICATION

(75) Inventor: John G. Apostolopoulos, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 452 days.

(21) Appl. No.: 09/760,693

(22) Filed: Jan. 16, 2001

(65) Prior Publication Data

US 2002/0094029 A1 Jul. 18, 2002

(51) Int. Cl.[7] .............................. H04B 1/66; H04N 7/12; H04N 7/173; G06K 9/86
(52) U.S. Cl. ..................... 375/240.16; 382/236; 725/87; 348/416.1
(58) Field of Search ...................... 375/240.16, 240.12, 375/240.1, 240.23, 240.03; 725/87, 136; 348/561, 699, 700, 416.1; 707/4, 104.1; 380/230

(56) References Cited

U.S. PATENT DOCUMENTS

| | | | |
|---|---|---|---|
| 5,321,750 A | * | 6/1994 | Nadan .......................... 380/230 |
| 5,991,443 A | | 11/1999 | Gallery et al. |
| 6,275,531 B1 | * | 8/2001 | Li .......................... 375/240.12 |
| 6,282,549 B1 | * | 8/2001 | Hoffert et al. ............ 707/104.1 |
| 6,292,512 B1 | * | 9/2001 | Radha et al. ............. 375/240.1 |
| 6,349,297 B1 | * | 2/2002 | Shaw et al. ..................... 707/4 |
| 6,476,873 B1 | * | 11/2002 | Maeng ......................... 348/561 |

FOREIGN PATENT DOCUMENTS

WO    WO99/65243    12/1999

OTHER PUBLICATIONS

Webster, John G.; Wiley Encyclopedia if Electrical and Electronics Engineering; 1999; pp. 151–165.

* cited by examiner

Primary Examiner—Gims Philippe
(74) Attorney, Agent, or Firm—Lloyd E. Dakin, Jr.

(57) ABSTRACT

A system and method for client-assisted motion estimation for client-server video communication is disclosed. The present invention includes the steps of receiving a request to update a current set of pixels within a video display on a client computer, and generating a motion vector for moving the current set of pixels within the video display using video information obtained only from the request and the client computer. In addition to sets of pixels, the present invention operates as well on objects, blocks and frames of video information.

38 Claims, 8 Drawing Sheets

CLIENT-ASSISTED MOTION ESTIMATION FOR CLIENT-SERVER VIDEO COMMUNICATION

CROSS-REFERENCE TO RELATED APPLICATIONS

This application relates to and incorporates by reference co-pending U.S. patent application Ser. No. 09/561315, entitled "Transcoding Method And Transcoder For Transcoding A Predictively-coded Object-based Picture Signal To A Predictively-coded Block-based Picture Signal," filed on Apr. 28, 2000, by John Apostolopoulos et al., assigned to Hewlett-Packard Co. of Palo Alto, Calif.

BACKGROUND OF THE INVENTION

1. Field of the Invention

The present invention relates generally to systems and methods for client-server communication, and more particularly to client-assisted motion estimation for client-server video communication.

2. Discussion of Background Art

A typical network involves a software application running on a client computer which retrieves information and accesses resources managed by a server computer. Resources available at the client and server vary depending upon the network and its functionality. For example, the client may be a laptop, handheld PC (e.g. WinCE® machine) or some other type of computer, and may have either full-power versions of software applications or lighter versions (e.g. a pocket-browser).

Standard protocols involve client requests for data from the server, which the server then retrieves and/or generates, and which the client then processes and displays. Sometimes the server may perform some pre-processing which assists the client, such as streamlining web pages, while the client performs final-processing and rendering of the data, (e.g. the client takes streamlined HTTP data and creates a web page).

While processing and bandwidth requirements vary, high-bandwidth information transfers over computer networks are becoming more and more common, especially with the growth of e-commerce. For example, computers are more and more being used for browsing through web pages, panning through JPEG images, controlling multi-media MPEG movie players, playing video games, and/or remotely operating various software applications, such as Word, Excel, PowerPoint, etc. In many instances, many frames of video information are transmitted to client computers in response to client requests.

FIG. 1 is a dataflow diagram of a conventional video compression system 100. Within the system 100, a client 102, displaying a current frame, sends a request for a new frame over line 104 to a server 106. A retrieve material module 108 within the server 106 retrieves the new frame and sends the new frame contained within the current frame (a.k.a. "P-Blocks") to a motion estimation (ME) module 110 to determine if blocks in the new frame may be accurately predicted using blocks from the current frame. Blocks in the new frame which can not be accurately predicted are coded as intra-frame (a.k.a. "I-blocks") without prediction.

The ME module 110 generates one or more motion vectors (MVs) for predicting motion of blocks in the new frame with reference to previous positions of the blocks in the current frame. The ME module 110 conventionally computes these MV's using a brute force method which compares each block in the new frame with a corresponding block in the current frame. A prediction error (PE) is then computed from each MV. The ME module 110 contains, by far, the most complex and computationally intensive algorithms used in the system 100, and thus consumes a substantial amount of the server's 106 computational time.

The encode module 112 within the server 106 receives the MVs and PEs from the ME module 110. The encode module 112 determines whether each block should be coded as a P or I block before coding the blocks into a compressed bit-stream. The compressed bit-stream is then transmitted to the client 102 on line 114. A decoder 116 within the client 102 conventionally decodes the bit-stream into the new frame to be displayed by the client computer 102.

Due to the dramatically growing popularity of modern networks, where a relatively small number of servers service a much greater number of clients, and the growth in multi-media transmitted over such networks, there has been a significant increase in demand for greater server processing power and greater bandwidth. This demand is driving up both the cost and complexity of servers and networks at an unparalleled rate. What is needed is a system and method for client-server communication that reduces these costs and overcomes these problems in the prior art.

SUMMARY OF THE INVENTION

The present invention is a system and method for client-assisted motion estimation for client-server communication. The system and method of the present invention includes the steps of receiving a request to update a current set of pixels within a video display on a client computer, and generating a motion vector for moving the current set of pixels within the video display using video information obtained only from the request and the client computer. In addition to sets of pixels, the present invention operates as well on objects, blocks and frames of video information.

The receiving step may also include the step of receiving a motion request to translate subsets of the current set of pixels by predetermined amounts, and the generating step may also include the step of generating a corresponding set of motion vector for moving the subsets within the video display by the predetermined amounts.

The receiving step may also include the step of receiving a motion request to keep static a second subset of the current set of pixels, and the generating step may also include the step of instructing the client computer to leave the second subset undisturbed within the video display.

The present invention may further include the steps of, identifying gaps in the video display after moving the subsets by the predetermined amounts, and retrieving new video information from a server computer containing new video pixels corresponding to the gaps in the video display, after which the gaps in the video display with the new video pixels.

The present invention provides for inactivating resources for computing motion estimation using non-client video information obtained from other than the request and the client computer. The present invention provides for performing quality evaluation on the motion vectors created from the request and client video information.

When implemented in a client-server network, the present invention permits an exchange of side information between the client and server so that responsibility for executing the receiving and generating steps of the present invention may be delegated between the client and server as resources permit.

The system and method of the present invention are particularly advantageous over the prior art because new material requested by a client computer over a network from a server is often related to old material already at the client, and the present invention enables the server to use the client request itself to direct various compression, decompression, and communication operations.

Thus present invention uses these client requests to selectively retrieve and generate motion vectors at the server which take advantage of visual information already on the video display. Updates to client video displays can thus be transmitted over the network using significantly less bandwidth than current prior art communications systems.

Also, since motion vector calculations using conventional methods can make up to 90% of server computations, the present invention, by estimating the motion vectors from client requests, essentially bypasses conventional complex motion vector calculations.

These and other aspects of the invention will be recognized by those skilled in the art upon review of the detailed description, drawings, and claims set forth below.

DETAILED DESCRIPTION OF THE PREFERRED EMBODIMENT

Figure 1:
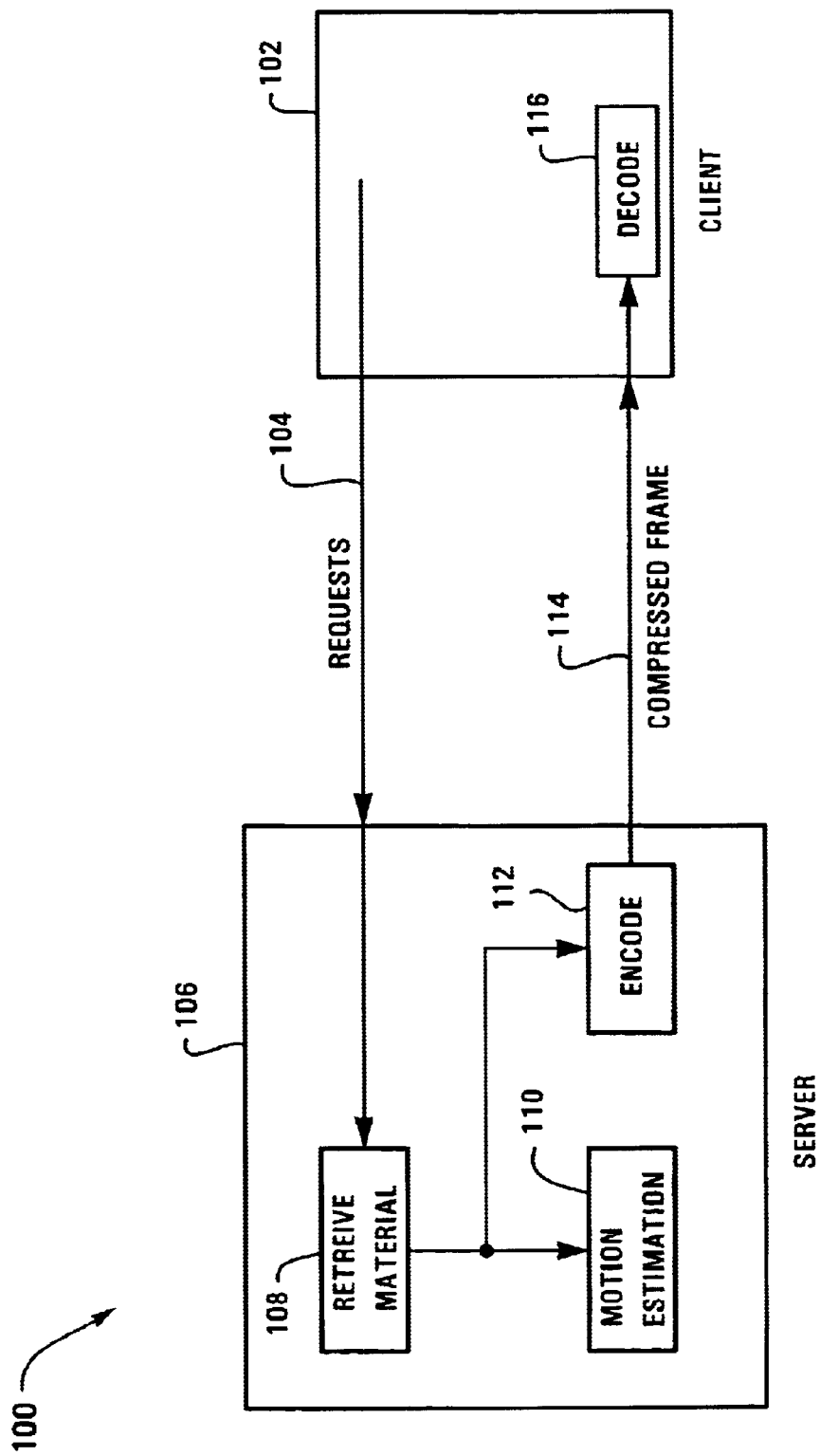
FIG. 1 (Prior Art) is a dataflow diagram of a conventional client-server communication system.
Figure 2:
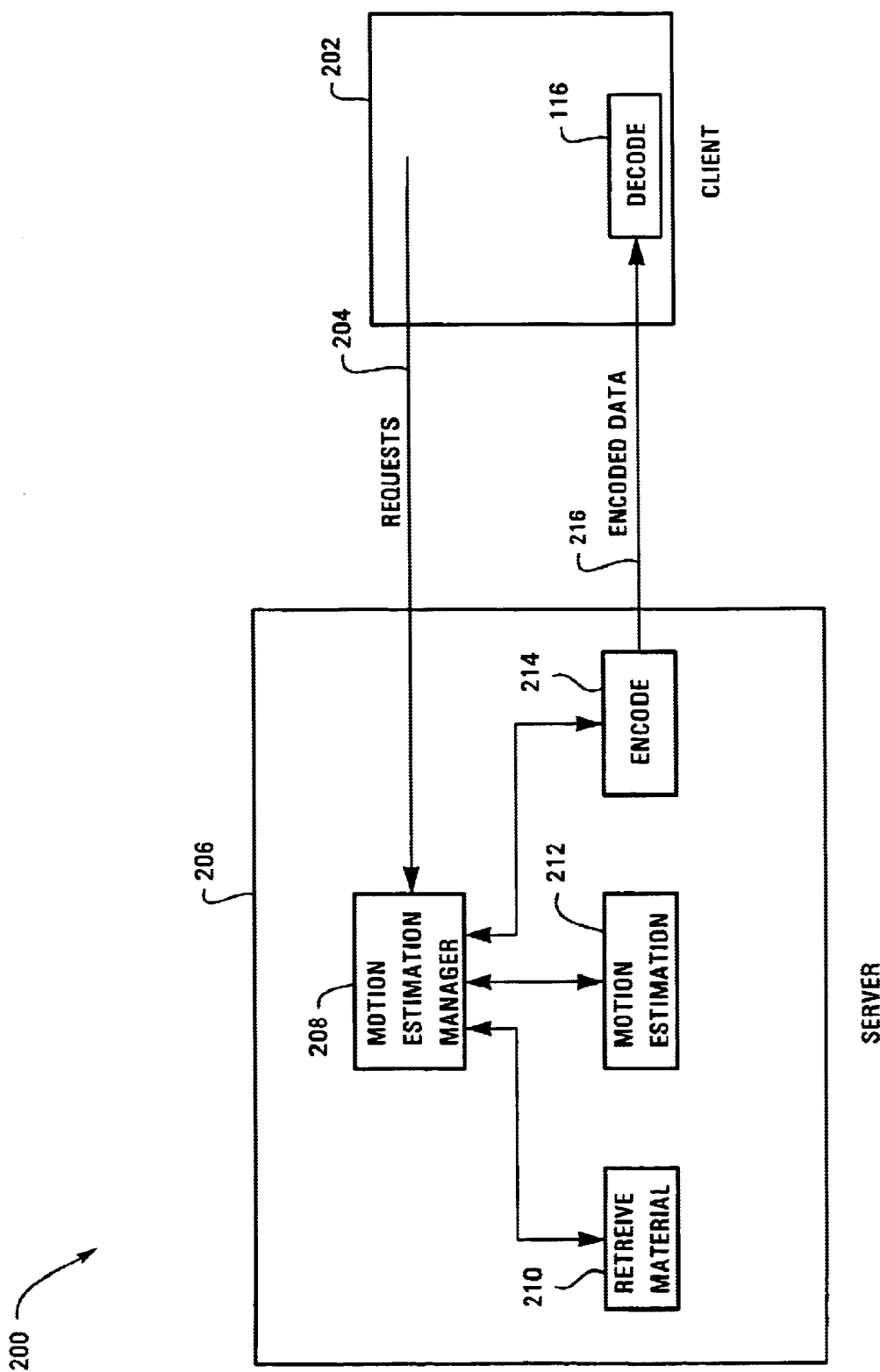
FIG. 2 is a dataflow diagram of one embodiment of a system for client-assisted motion estimation for client-server communication.

FIG. 2 is a dataflow diagram of one embodiment of a system 200 for client-assisted motion estimation for client-server communication. Within the system 200, a client 202 video display images a current frame, block, or set of pixels. Sets of pixels are also known as "objects." Objects have an arbitrary shape. Thus, while the system 200 is discussed primarily with reference to frames and blocks, the present invention is equally applicable to objects. In visual applications, frames, blocks, and objects describe a single image or portion thereof on a computer display. Frames are typically divided into a matrix of blocks, and each block or object typically contains a matrix of pixels.

In response to a user command, the client 202 generates a client request. User commands include mouse movements, text selections, scrolling, panning, paging up/down, as well as many others computer commands known to those skilled in the art. The client 202 formats these user commands in to client request containing video information on how to map one or more portions of the current frame into a new frame based on the user commands.

The client 202 sends the client request over line 204 to a server 206. The server 206 includes a motion estimation (ME) manager 208, which receives the client request.

The ME manager 208 analyzes the request. Those skilled in the art will recognize that client requests are in a format defined by each particular software application being executed by the client 202. These formats identify which pixels, objects, blocks, frames, and web pages within the current frame are to remain static, undergo translations, or be completely replaced.

The ME manager 208 then divides the client requests into several types, including: static/no-motion requests, global motion requests, partial motion requests, and new data requests. Depending upon the type of request, blocks are either standby-coded, Intra-coded (a.k.a. "I" coded—without prediction), and Inter-coded (a.k.a. "P" or "B" coded—with prediction) before being sent back to the client 202. Standby-coded blocks are generated in response to static motion requests; I-coded blocks are generated in response to new block requests; and motion vectors (MVs) and P or B-coded blocks are generated in response to global/partial motion requests.

A retrieve material module 210 retrieves new blocks of frame video information as required by the ME manager 208 during I-block generation. This new frame video information is not available at the client and is defined herein as non-client video information. A ME module 212 performs conventional block-by-block motion estimation between current blocks and new blocks as required by the ME manager 208 during P/B-block generation.

An encode module 214, within the server 206, receives various standby-codes, I-blocks, and MVs from the ME manager 208. The encode module 214 then converts the MVs into prediction errors and assembles a new frame packet into a compressed bit-stream for transmission to the client 202. The encode module 214 is preferably standard-compliant, although it need not be.

A decode module 220, in the client 202, receives and converts the new frame packet into the new frame which then replaces the current frame on the client 202 video display. The decoder is also preferably standard-compliant, although it need not be.

Operation of the ME manager 208 and each of the modules 210–214, and 218 is discussed in more detail below.

Figure 3:
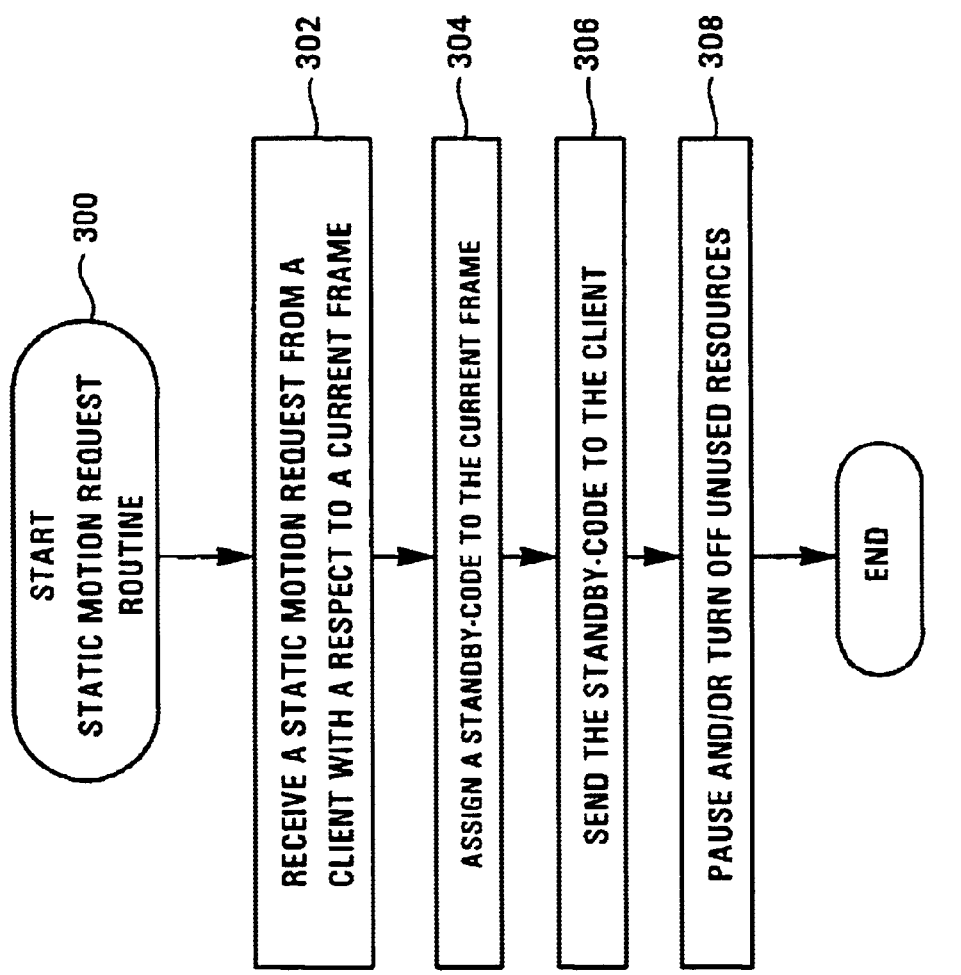
FIG. 3 is a flowchart of one embodiment of a method for responding to a static motion request within the system.

Static/No-Motion Requests:

FIG. 3 is a flowchart of one embodiment of a method 300 for responding to a static motion request within the system 200. In step 302, the ME manager 208 within the server 206 receives a static motion request. In step 304, the ME manager 208 assigns a standby-code to the current frame. The standby-code is a simple "use last decoded frame" command. In such a completely static situation video quality at the client 202 is already very high or nearly perfect. The ME manager 208 sends the standby-code to the encode module 214.

And, in step 306, the encode module 214 receives the standby-codes and assembles a new frame packet containing the standby-codes. The encode module 214 next transmits the packet over line 216 to the client 202. The decode module 218, within the client 202, decodes the standby-codes in the new frame packet and in response keeps the current frame in the client 202 video display buffer undisturbed.

In step 308, the ME manager 208 also pauses and/or turns off the retrieve material module 210, the ME module 212, and any other server 206 resources which normally perform conventional motion vector computations and compression operations.

Thus the present invention recognizes when video information is static at the client 202 and in response, conserves limited server computing resources and limited network bandwidth by not compressing and transmitting what amounts to only a static image.

Figure 4:
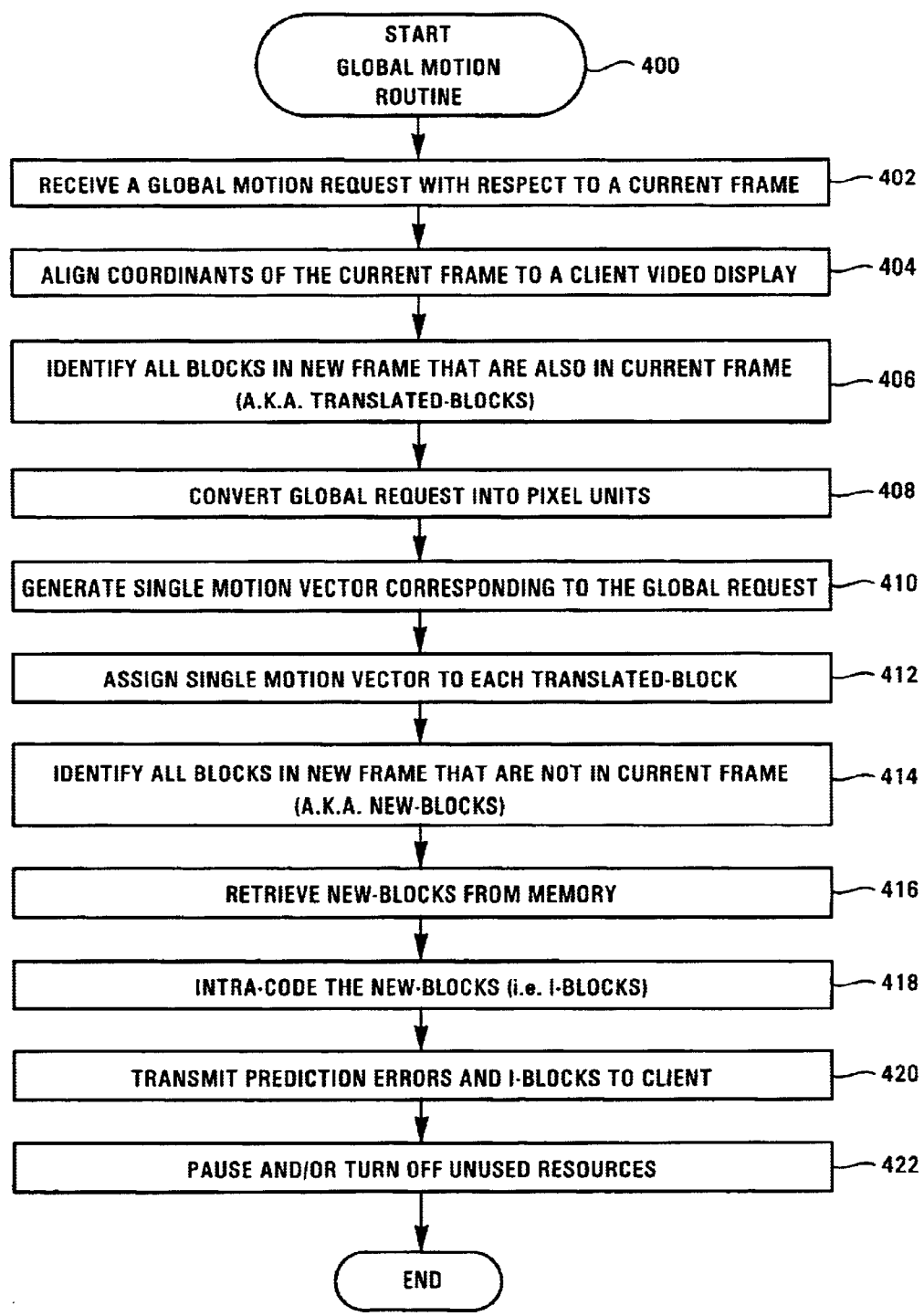
FIG. 4 is a flowchart of one embodiment of a method for responding to a global motion request routine within the system.

Global Motion Requests:

FIG. 4 is a flowchart of one embodiment of a method 400 for responding to a global motion request within the system 200. In step 402, the ME manager 208 receives a request that the current frame being displayed on the client 202 be globally translated/moved.

In step 404, the ME manager 208 aligns an origin of a coordinate system of the current frame with a coordinate system of the client video display. The origin usually corresponds to an upper left corner of the client 202 video display, where positive horizontal is right and positive vertical is down; however, if the origin is different, then an appropriate offset and or sign switch must be effected.

The ME manager 208, in step 406, determines which blocks within the new frame are also within the current frame. These are also known as translated-blocks.

In step 408, the ME manager 208 converts the client motion request into pixel units, if not already in pixel units. Thus, if the video information in the client request contains a specific number of pixels by which a set of pixels is to be translated, no conversion is required. For example, a client request to pan through a displayed picture contains both a panning command as well as an explicit number of pixels by which the displayed picture is to be panned.

Alternatively, if video information within the client request specifies translations in a fractional or percentage portion of the current frame, then the ME manager 208 must convert the fraction/percentage into a specific number of pixels. For example, a client request to translate the current frame downward by 1/10 of the current frame size is converted into a 64 pixel downward movement, if the current frame is 640×480 pixels in size. Video information available from the client, in addition to video information within the request, such as the size of the current frame on the client computer, is herein defined as client video information.

If the information in the client request is a complex mathematical expression then the ME manager 208 must evaluate the expression to determine a corresponding number of pixels to translate the current frame. The ME manager 208 can compute pixel motion from the complex mathematical expression in a number of ways, including: (1) using a motion at a center of a block, (2) using motion at various points in a block (e.g. center and four corners), (3) using an average of motion at all pixels within a block, (4) using a median of motion at all pixels in a block, (5) using motion that overlaps a largest number of pixels in a block.

The ME manager 208, in step 410, then generates a single motion vector (MV) corresponding to the global request. Motion vectors indicate a direction and a magnitude for translating blocks.

In step 412, the ME manager 208 assigns the single MV to each of the translated-blocks. For example, if the client request that the new frame moves globally by (5,−7) pixels with respect to the current frame, then the ME manager 208 generates a single motion vector of (5,−7) which is assigned to each of the translated-blocks. The ME manager 208 sends the single MV to the encode module 214.

The ME manager 208, in step 414, identifies all blocks within the new frame that are not within the current frame. These are also known as new-blocks and they fill gaps in the client 202 video display left after the translated-blocks are moved within the video display. In step 416, the ME manager 208 retrieves the new-blocks from the retrieve material module 210. The MB manager 208, in step 418, instructs the encode module 214 to intra-code the new-blocks, creating I-blocks. In an alternate embodiment, the ME manager 208, in step 418, also sends the new-blocks to the ME module 212 for conventional MV computation. The MB manager 208 then performs a quality check to determine if the computed MVs provide good predictions. If the MVs provide good predictions for the new-blocks, the ME manager 208 instructs the encode module 214 to inter-code the new-blocks, creating P-blocks.

The encode module 214, in step 420, converts all received MVs into a corresponding prediction errors. Note, "prediction errors" in video compression and techniques for generating them from motion vectors are well known. The encode module 214 then assembles a new frame packet containing the prediction errors and I-blocks and transmits the packet over line 216 to the client 202. The decode module 218 receives the new frame packet and in response generates the new frame for display at the client 202.

In step 422, while responding to the global request, the ME manager 208 preferably inactivates any unused resources, such as the ME module 212, by pausing them, placing them into a standby mode, or turning them off. By inactivating the ME module 214, substantial server 206 resources are conserved.

Thus, by using the motion information in the client request, the ME manager 208 calculates MVs for the translated-blocks in a relatively straightforward manner, eliminating any need to employ conventional brute-force motion estimation techniques of the ME module 212.

Figure 5:
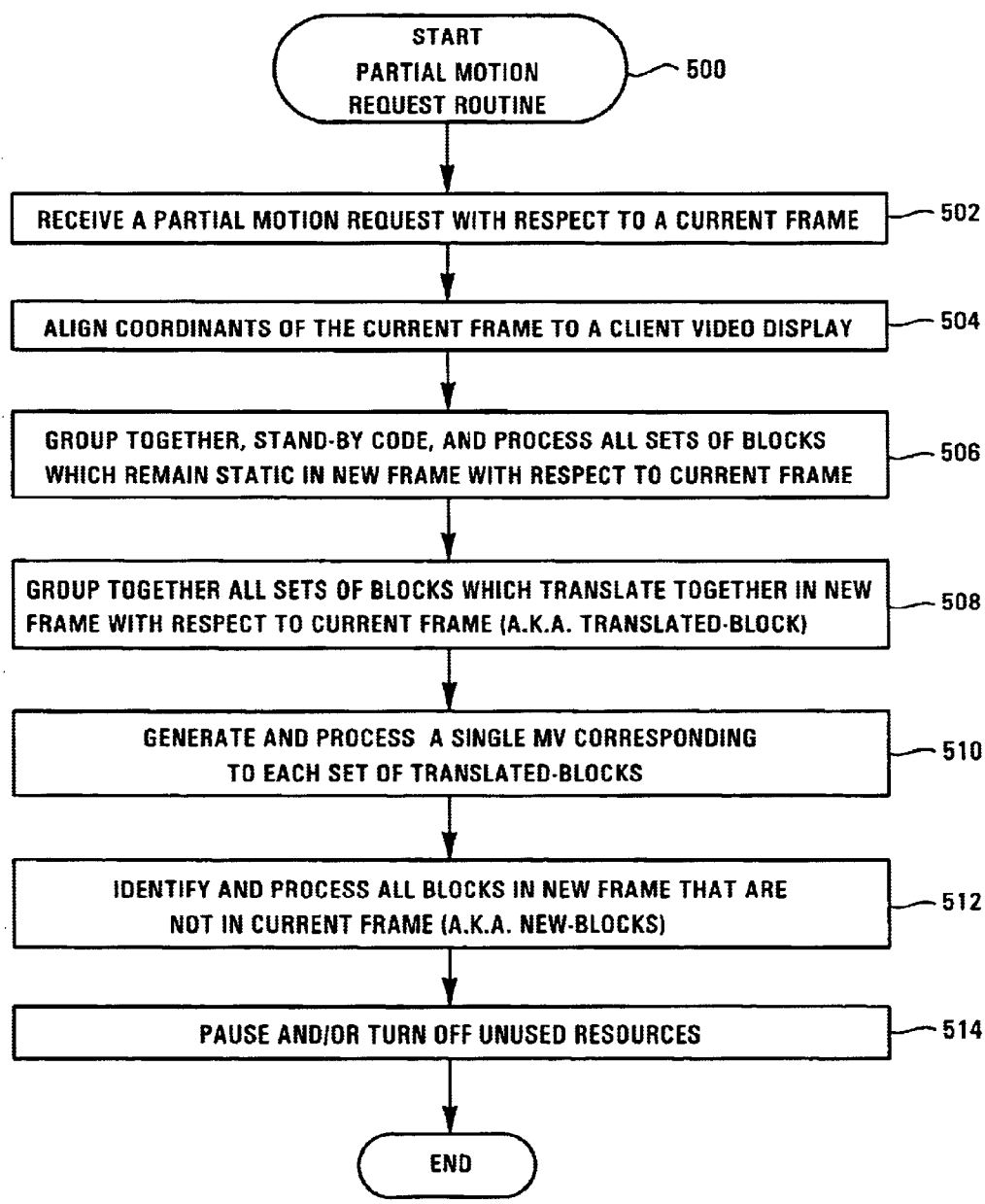
FIG. 5 is a flowchart of one embodiment of a method for responding to a partial motion request routine within the system.

Partial Motion Requests:

FIG. 5 is a flowchart of one embodiment of a method 500 for responding to a partial motion request within the system 200. Partial motion requests are client requests that one or more portions of the current frame be translated within the new frame. Partial motion requests are a blend of static motion requests and global motion requests in that some sets of blocks remain static while others translate.

In step 502, the ME manager 208 receives a request that the current frame being displayed on the client 202 be partially translated. In step 504, the ME manager 208 aligns the origin of the coordinate system of the video display with the coordinate system of the current frame according to step 404 of FIG. 3.

The ME manager 208, in step 506, groups together all sets of blocks which remain static in the new frame with respect to the current frame. The ME manager 208 then assigns a standby-code to each set of static blocks and send them to the encode module 214 for transmission to the client 202 in accordance with step 306 of FIG. 3.

The ME manager 208, in step 508, groups together all sets of blocks which translate together in the new frame with respect to the current frame. The ME manager 208 then converts the client request into pixel units according to step 408 of FIG. 4.

In step 510, the ME manager 208 then generates a single MV corresponding to each set of translated blocks. If there are sets of blocks in the current frame which overlap and/or undergo multiple movements, the ME manager 208 executes an "occupancy/overlap" algorithm which ranks and assigns a MV to each set of translated-blocks. Occupancy algorithms are discussed with reference to U.S. patent application Ser. No. 09/561315, entitled "Transcoding Method And Transcoder For Transcoding A Predictively-coded Object-based Picture Signal To A Predictively-coded Block-based Picture Signal," filed on Apr. 28, 2000, by John Apostolopoulos et al., which is herein incorporated by reference.

If, however, overlapping movements exceed a predetermined threshold, the MB manager 208 abandons using the client request to compute a new MV and instead retrieves new-blocks from the retrieve material module 212 and sends them to the ME module 212 for conventional MV computation.

After MV computation, the ME manager 208 sends the MVs to the encode module 214 for processing in accordance with step 420 of FIG. 4.

In step 512, the ME manager 208 identifies and processes into I-blocks all blocks within the new frame that are not within the current frame in accordance with steps 414 through 418 in FIG. 4. The ME manager 208 then sends the I-blocks to the encode module 214 for processing in accordance with step 420 of FIG. 4.

While responding to the partial motion request, the ME manager 208, in step 514, preferably pauses and/or turns off any unused resources, such as the ME module 212 except in the overlapping block context discussed above.

New Data Requests:

If the ME manager 208 receives a request that the current frame being displayed on the client 202 be completely replaced (e.g. a user clicking on a hyperlink), the MB manager 208 processes the request and generates I-blocks for each block in the new frame in accordance with steps 416 and 418 of FIG. 4. The ME manager 208 then sends the I-blocks to the encode module 214 for processing in accordance with step 420 of FIG. 4.

While responding to the partial motion request, the ME manager 208 preferably pauses and/or turns off any unused resources, such as the ME module 212.

Figure 6:
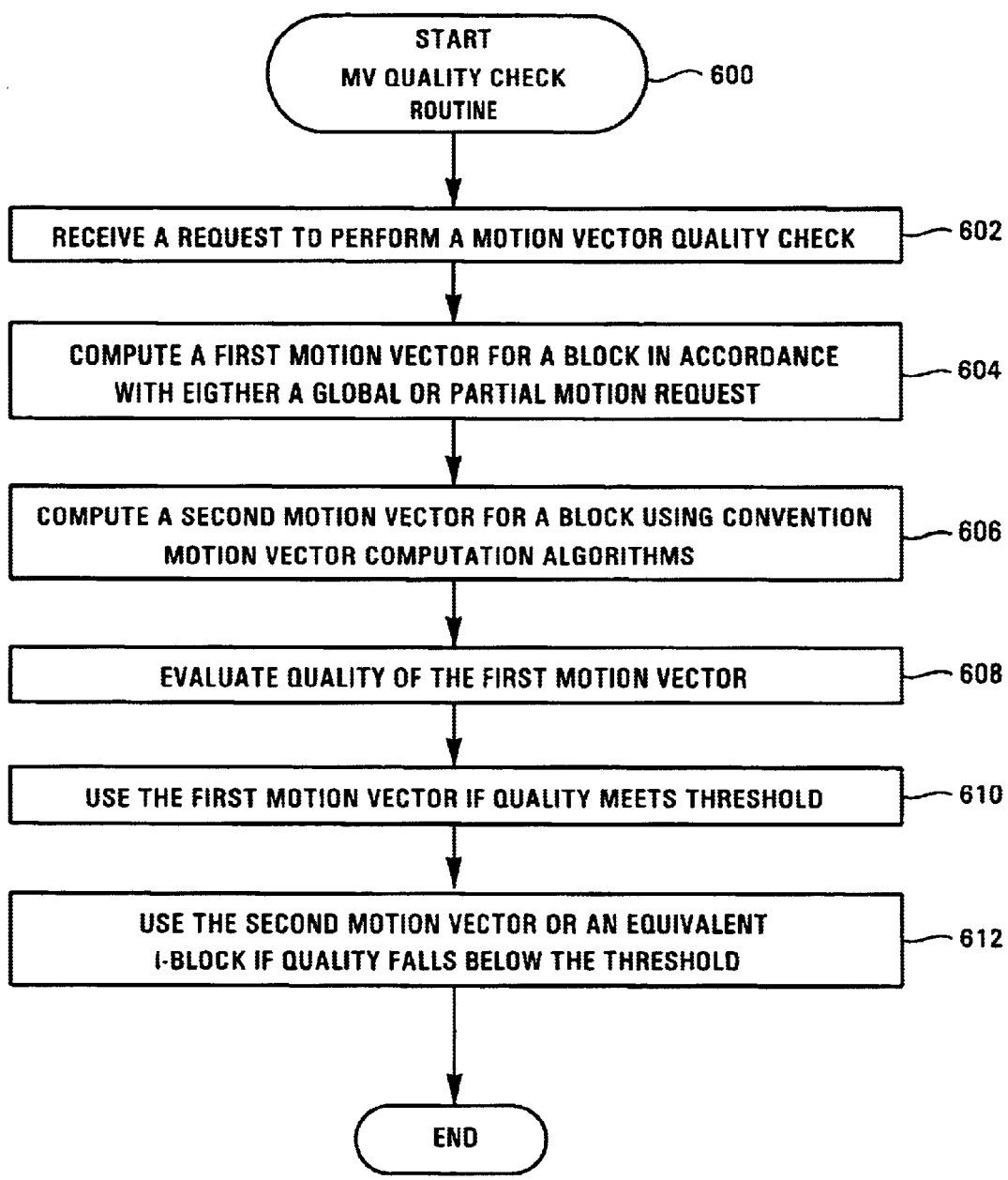
FIG. 6 is a flowchart of one embodiment of a method for performing motion vector quality checking within the system.

Coding Quality:

While using client requests to simplify frame processing and motion vector calculations as described above is preferred, the present invention provides for comparing MVs generated by internal ME manager 208 routines with MVs generated solely by the ME module 212. FIG. 6 is a flowchart of one embodiment of a method 600 for performing MV quality checking within the system 200.

Quality checks can be performed at any time, such as at a beginning of a new client-server communication session. To begin, the ME manager 208 in step 602 receives a request from either the client 202 or the server 206 to perform a MV quality check. In step 604, the ME manager 208 computes a first MV for a block in accordance with either the global or partial motion request routines described with respect to FIGS. 4 and 5 above. The ME manager 208 then commands the ME module 212, in step 606, to compute a second MV for the block, using convention MV computation algorithms.

In step 608, the ME manager 208 evaluates quality of the first MV by comparing a first prediction error generated from the first MV to either a predetermined threshold, a second prediction error generated from the second MV, and/or evaluates the first MV using some other technique, in order to determine the first MV's quality. Other techniques for determining quality include using signal to noise ratio techniques, comparing the first prediction error to a mean-absolute error (MAE) or a mean-square error (MSE), or using rate-distortion (R/D) algorithms, which calculate a number of bits required to code the first prediction error in comparison with a number of bits required to code either the second prediction error or an equivalent I-block.

In step 610, if the quality of the first prediction error meets a predetermined threshold, the ME manager 208 sends the first MV to the encode module 214 for processing as discussed above.

If however, the quality is below the predetermined threshold, the ME manager 208, in step 612, selects from a number of possible alternatives, such as refining the first MV (i.e. performing a partial search around a position of the first MV), sending the second MV to the encode module 214 instead of the first MV, or I-coding the block.

This flexibility in using, improving upon, or not using MV computed from a client request provides a robustness to the present invention.

Figure 7:
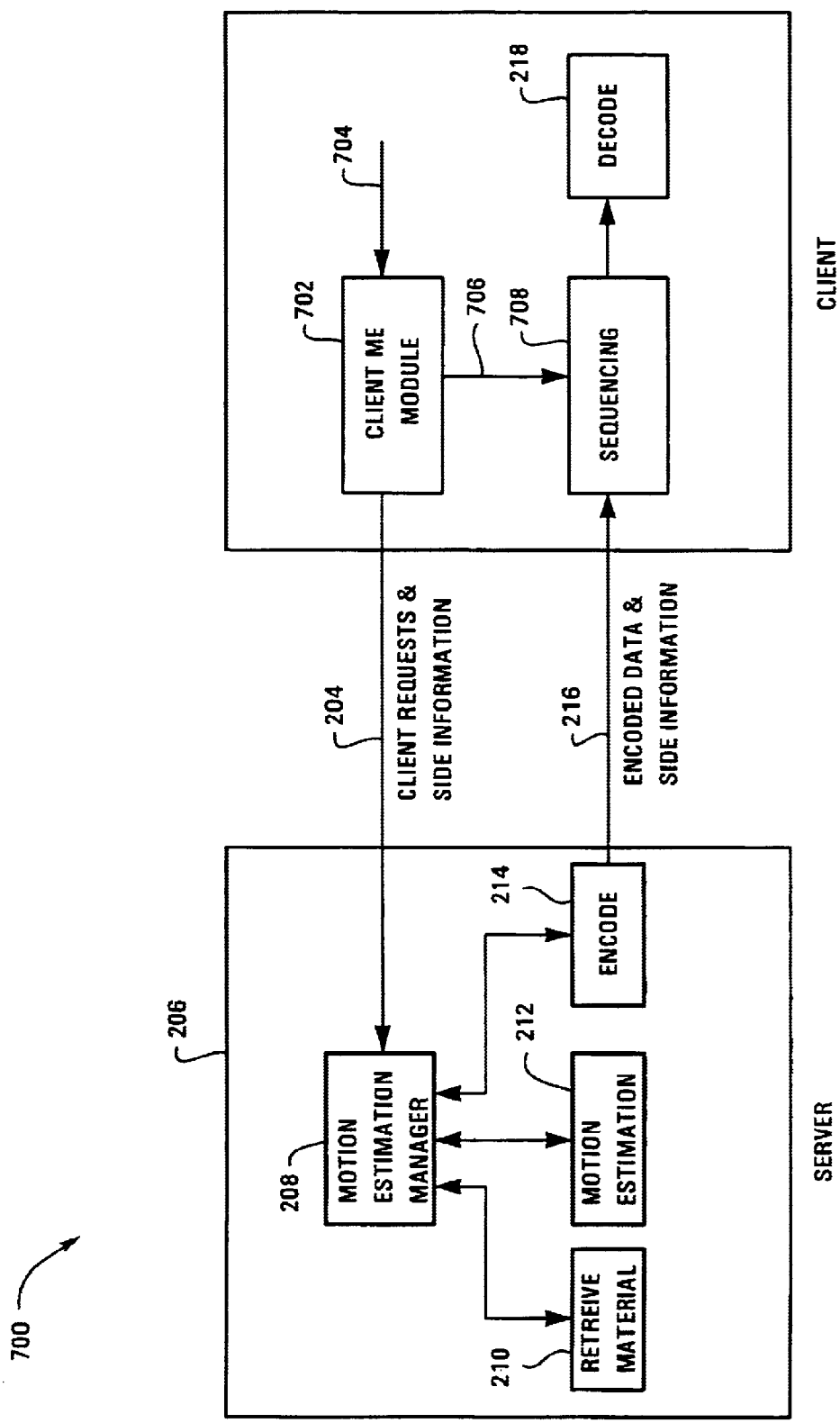
FIG. 7 is a dataflow diagram of one embodiment of a second system for client-assisted motion estimation for client-server communication.

FIG. 7 is a dataflow diagram of one embodiment of a second system 700 for client-assisted motion estimation for client-server video communication. In the second system 700, the client 204 includes a client ME module 702 which receives a standard client request on line 704 and transmits a shortened client request and side information to the ME manager 208 over line 204. The client ME module 702 also passes information over line 706 to a bit-stream sequencing module 708. The bit-stream sequencing module 708 also receives encoded data and side information from the server 206 over line 216. Operation of these modules 702 and 708 are discussed in detail below.

Figure 8:
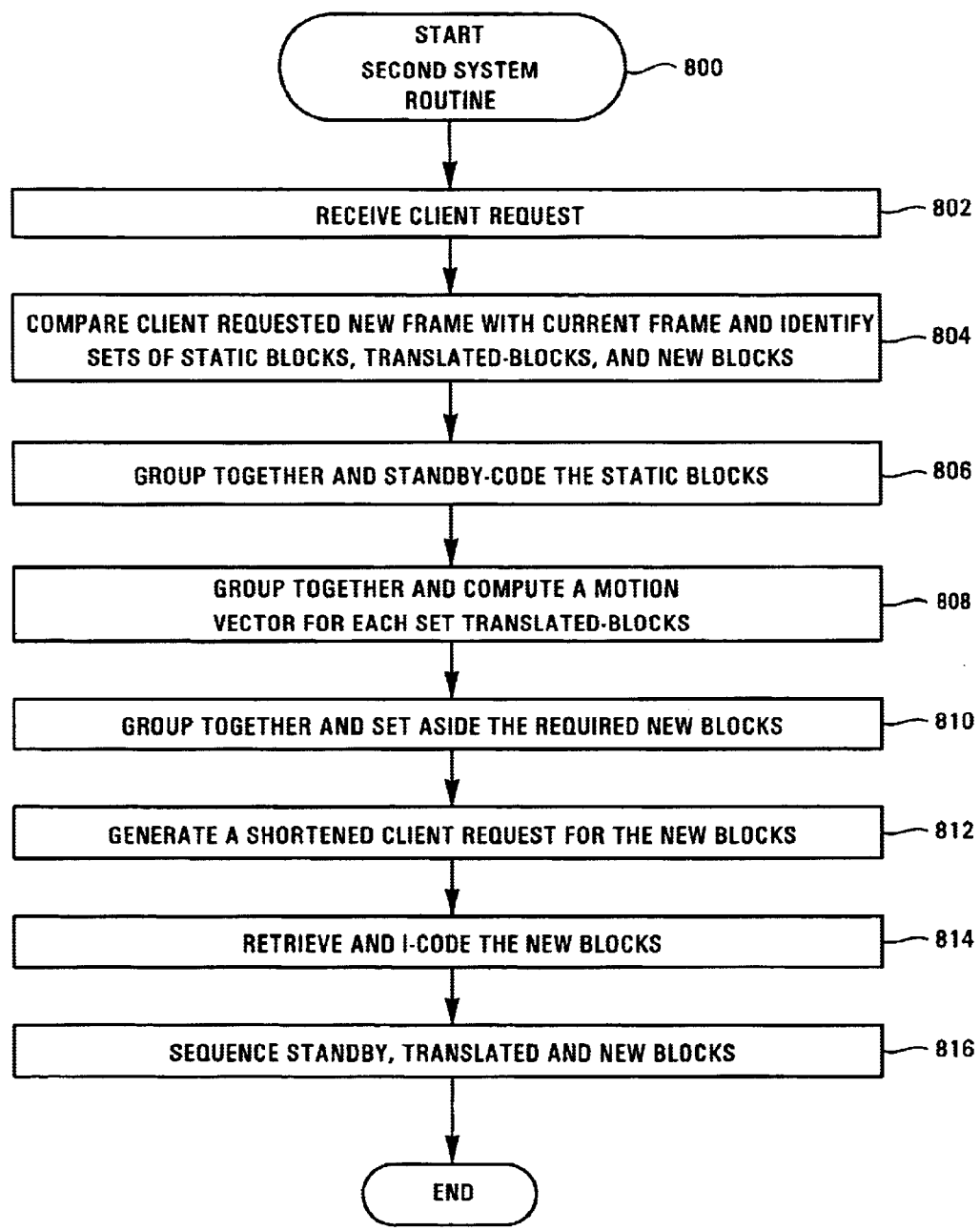
FIG. 8 is a dataflow diagram of one embodiment of a third system for client-assisted motion estimation for client-server communication.

FIG. 8 is a flowchart of one embodiment of a method 800 for performing MV quality checking within the second system 700. In step 802, the client ME module 702 receives the standard client request on line 704 in response to a user command on the client 202. The client ME module 702 then assumes responsibility for several of the ME manager's 208 functions. Specifically, in step 804, the client ME module 702 compares the client requested new frame with the current frame and identifies sets of static blocks, translated-blocks, and new blocks. In step 806, the client ME module 702 groups together the static blocks and standby-codes them according to the steps discussed with respect to FIG. 3. The client ME module 702, in step 808, groups together the sets of translated-blocks and computes a MVs for each set, according to the steps discussed with respect to FIGS. 4 and 5. The client ME module 702, in step 810, groups together and sets aside the required new blocks.

In step 812, the client ME module 702 generates a shortened client request from the standard client request. The shortened client request includes a request for the specific set of new blocks and preferably does not include any request for static or translated blocks. The client ME module 702 then transmits the shortened request over line 204 to the ME manager 208. The ME manager 208, in step 814, retrieves the new blocks from the retrieve material module 210 as specified in the shortened client request, and instructs the encode module 214 to I-code and transmit the new blocks to the sequencing module 708 in the client 202.

In step 816, the sequencing module 708 receives the standby-codes and MVs from the client ME module 702 and the I-coded new blocks from the server 206 and sequences them into a standard-compliant bit-stream for the decode module 218 to process into the new frame for display on the client 202 computer.

Thus by taking over many of the ME manager's 208 functions, the client ME module 702 significantly reduces computational demands on the server 206 and enables a significantly more compact non-standard compliant bit-stream to be sent over line 216 to the client 202. This also permits the decoder 218 to be a standard-compliant decoder.

Additionally, the client 202 and server 206 can exchange "side-information" which can enable the server 206 to perform dynamic load-balancing within the system 700. "Side-information" is herein generically defined to include any information which describes what information either the client 202 and/or server 206 is processing and how that information is being processed.

Thus by sending side information back and forth between the client 202 and server 206, network resources can be managed in any number of ways. For instance, depending on a number of different client computers which the server 206 is connected to, the server 206, through the use of side information, can query the different clients for their current processing capacity and shift some motion estimation management responsibilities to the different clients in order to avoid having the server's 206 limited computational capacity or the network's limited bandwidth from slowing down the network.

While one or more embodiments of the present invention have been described, those skilled in the art will recognize that various modifications may be made. Variations upon and modifications to these embodiments are provided by the present invention, which is limited only by the following claims. Also, while this description has discussed the present invention in terms of a client-server computer network, those skilled in the art will know that the present invention is applicable to any information processing application that involves communication between two points, such as peer-to-peer networking.

What is claimed is:

1. A method for client-assisted motion estimation, comprising:
   receiving a client computer request at a server computer to translate a current set of pixels within a video display on the client computer;
   converting the client request into a specific number of pixels by which the set of pixels is to be translated using video information obtained from the client computer;
   generating a motion vector for moving the set of pixels within the video display from the converted client request, without using motion estimation; and
   transmitting the motion vector back to the client computer.

2. The method of claim 1 wherein the sets of pixels are blocks.

3. The method of claim 1 wherein the sets of pixels are frames.

4. The method of claim 1 wherein:
   the receiving element includes receiving a client request to translate a subset of the current set of pixels by a predetermined amount; and
   the generating element includes generating a single motion vector for moving the subset within the video display by the predetermined amount.

5. The method of claim 4 wherein:
   the receiving element includes receiving a client request to keep static a second subset of the current set of pixels; and
   the generating element includes instructing the client computer to leave the second subset undisturbed within the video display.

6. The method of claim 4:
   further including,
      identifying gaps in the video display after moving the subset by the predetermined amount;
      retrieving new video information from the server computer containing new video pixels corresponding to the gaps in the video display; and
   wherein the generating element includes replacing the gaps in the video display with the new video pixels.

7. The method of claim 4 wherein
   the client request is a global motion request; and
   the subset includes all of the current set of pixels.

8. The method of claim 1 wherein:
   the receiving element includes receiving a client request which is a partial motion request for translating a plurality of subsets of the current set of pixels by a corresponding plurality of predetermined amounts; and
   the generating element includes generating a plurality of motion vectors for moving the plurality of subsets within the video display by the corresponding plurality of predetermined amounts.

9. The method of claim 1 wherein:
   the receiving element includes receiving a client request which is a static motion request for translating all of the current set of pixels; and
   the generating element includes instructing the client computer to leave the set of pixels undisturbed on the video display.

10. The method of claim 1 further including inactivating resources for computing motion estimation using non-client video information obtained from other than the request and the client computer.

11. The method of claim 1, wherein the motion vector is a first motion vector, further comprising:
   performing a quality evaluation on the first motion vector;
   generating a second motion vector by comparing the current set of pixels to a set of non-client video information retrieved from the server;
   using the second motion vector for moving the current set of pixels within the video display, if the quality of the first motion vector falls below a predetermined threshold.

12. The method of claim 1 further comprising:
   performing the receiving and generating on the client computer.

13. The method of claim 1 further comprising:
   exchanging side information between the client computer and the server computer; and
   delegating responsibility for executing the receiving and generating between the client and server computers in response to the side information.

14. A system for client-assisted motion estimation, comprising:
   means for receiving a client computer request at a server computer to translate a current set of pixels within a video display on the client computer;
   means for converting the client request into a specific number of pixels by which the set of pixels is to be translated using video information obtained from the client computer;
   means for generating a motion vector for moving the set of pixels within the video display from the converted client request, without using motion estimation; and
   means for transmitting the motion vector back to the client computer.

15. The system of claim 14:
   further including,
      means for identifying gaps in the video display after moving a subset of the current set of pixels by a predetermined amount;
      means for retrieving new video information from the server computer containing new video pixels corresponding to the gaps in the video display; and wherein the means for generating includes means for replacing the gaps in the video display with the new video pixels.

16. The system of claim 14 further including means for inactivating resources for computing motion estimation using non-client video information obtained from other than the request and the client computer.

17. The system of claim 14 further comprising:
means for exchanging side information between the client computer and the server computer; and
means for delegating responsibility for executing the receiving and generating steps between the client and server computers in response to the side information.

18. A computer-usable medium embodying computer program code for causing a computer to perform client-assisted motion estimation, comprising:
receiving a client computer request at a server computer to translate a current set of pixels within a video display on the client computer;
converting the client request into a specific number of pixels by which the set of pixels is to be translated using video information obtained from the client computer;
generating a motion vector for moving the set of pixels within the video display from the converted client request, without using motion estimation; and
transmitting the motion vector back to the client computer.

19. The computer-usable medium of claim 18 wherein:
the receiving element includes receiving a client request to translate a subset of the current set of pixels by a predetermined amount; and
the generating element includes generating a single motion vector for moving the subset within the video display by the predetermined amount.

20. The computer-usable medium of claim 19 wherein:
the receiving element includes receiving a client request to keep static a second subset of the current set of pixels; and
the generating element includes instructing the client computer to leave the second subset undisturbed within the video display.

21. The computer-usable medium of claim 19:
further including,
identifying gaps in the video display after moving the subset by the predetermined amount;
retrieving new video information from the server computer containing new video pixels corresponding to the gaps in the video display; and
wherein the generating element includes replacing the gaps in the video display with the new video pixels.

22. The computer-usable medium of claim 18 wherein:
the receiving element includes receiving a client request which is a partial motion request for translating a plurality of subsets of the current set of pixels by a corresponding plurality of predetermined amounts; and
the generating element includes generating a plurality of motion vectors for moving the plurality of subsets within the video display by the corresponding plurality of predetermined amounts.

23. The computer-usable medium of claim 18 further including inactivating resources for computing motion estimation using non-client video information obtained from other than the request and the client computer.

24. The computer-usable medium of claim 18 further comprising:
exchanging side information between the client computer and the server computer; and
delegating responsibility for executing the receiving and generating between the client and server computers in response to the side information.

25. The method of claim 1 wherein the receiving element includes:
receiving a client computer request to translate the set of pixels by a specific number of pixels.

26. The method of claim 1 wherein the receiving element includes:
receiving a client computer request to translate the set of pixels by a fraction of the video display.

27. The method of claim 1 wherein the receiving element includes:
receiving a client computer request to translate the set of pixels by a mathematical expression.

28. A method for client-assisted motion estimation, comprising the steps of:
receiving a request to update a current set of pixels within a video display on a client computer;
generating a motion vector for moving the current set of pixels within the video display using video information obtained only from the request and the client computer;
wherein the receiving step includes the step of receiving a motion request to translate a subset of the current set of pixels by a predetermined amount; and
wherein the generating step includes the step of generating a single motion vector for moving the subset within the video display by the predetermined amount.

29. A method for client-assisted motion estimation, comprising the steps of:
receiving a request to update a current set of pixels within a video display on a client computer;
generating a motion vector for moving the current set of pixels within the video display using video information obtained only from the request and the client computer;
wherein the receiving step includes the step of receiving a motion request to translate a subset of the current set of pixels by a predetermined amount;
wherein the generating step includes the step of generating a single motion vector for moving the subset within the video display by the predetermined amount;
further including the steps of,
identifying gaps in the video display after moving the subset by the predetermined amount;
retrieving new video information from a server computer containing new video pixels corresponding to the gaps in the video display; and
wherein the generating step includes the step of replacing the gaps in the video display with the new video pixels.

30. A method for client-assisted motion estimation, comprising the steps of:
receiving a request to update a current set of pixels within a video display on a client computer;
generating a motion vector for moving the current set of pixels within the video display using video information obtained only from the request and the client computer;
wherein the receiving step includes the step of receiving a static motion request for translating all of the current set of pixels; and
wherein the generating step includes the step of instructing the client computer to leave the set of pixels undisturbed on the video display.

31. A method for client-assisted motion estimation, comprising the steps of:
  receiving a request to update a current set of pixels within a video display on a client computer;
  generating a first motion vector for moving the current set of pixels within the video display using video information obtained only from the request and the client computer;
  performing a quality evaluation on the first motion vector;
  generating a second motion vector by comparing the current set of pixels to a set of non-client video information retrieved from a server; and
  using the second motion vector for moving the current set of pixels within the video display, if the quality of the first motion vector falls below a predetermined threshold.

32. A method for client-assisted motion estimation, comprising the steps of:
  receiving a request to update a current set of pixels within a video display on a client computer;
  generating a motion vector for moving the current set of pixels within the video display using video information obtained only from the request and the client computer;
  exchanging side information between the client computer and a server computer; and
  delegating responsibility for executing the receiving and generating steps between the client and server computers in response to the side information.

33. A system for client-assisted motion estimation, comprising:
  means for receiving a request from a client computer to update a current set of pixels within a video display;
  means for generating a motion vector for moving the current set of pixels within the video display using video information obtained only from the request and the client computer;
  wherein the means for receiving includes means for receiving a motion request to translate a subset of the current set of pixels by a predetermined amount;
  wherein the means for generating includes means for generating a single motion vector for moving the subset within the video display by the predetermined amount;
  wherein the means for receiving includes means for receiving a motion request to keep static a second subset of the current set of pixels; and
  wherein the means for generating includes means for instructing the client computer to leave the second subset undisturbed within the video display.

34. A system for client-assisted motion estimation, comprising:
  means for receiving a request from a client computer to update a current set of pixels within a video display;
  means for generating a motion vector for moving the current set of pixels within the video display using video information obtained only from the request and the client computer;
  wherein the means for receiving includes means for receiving a motion request to translate a subset of the current set of pixels by a predetermined amount;
  wherein the means for generating includes means for generating a single motion vector for moving the subset within the video display by the predetermined amount;
  means for identifying gaps in the video display after moving the subset by the predetermined amount;
  means for retrieving new video information from a server computer containing new video pixels corresponding to the gaps in the video display; and
  wherein the means for generating includes means for replacing the gaps in the video display with the new video pixels.

35. A system for client-assisted motion estimation, comprising:
  means for receiving a request from a client computer to update a current set of pixels within a video display;
  means for generating a motion vector for moving the current set of pixels within the video display using video information obtained only from the request and the client computer;
  means for exchanging side information between the client computer and a server computer; and
  means for delegating responsibility for executing the receiving and generating steps between the client and server computers in response to the side information.

36. A computer-usable medium embodying computer program code for causing a computer to perform client-assisted motion estimation, comprising the steps of:
  receiving a request from a client computer to update a current set of pixels within a video display;
  generating a motion vector for moving the current set of pixels within the video display using video information obtained only from the request and the client computer;
  wherein the receiving step includes the step of receiving a motion request to translate a subset of the current set of pixels by a predetermined amount;
  wherein the generating step includes the step of generating a single motion vector for moving the subset within the video display by the predetermined amount;
  wherein the receiving step includes the step of receiving a motion request to keep static a second subset of the current set of pixels; and
  wherein the generating step includes the step of instructing the client computer to leave the second subset undisturbed within the video display.

37. A computer-usable medium embodying computer program code for causing a computer to perform client-assisted motion estimation, comprising the steps of:
  receiving a request from a client computer to update a current set of pixels within a video display;
  generating a motion vector for moving the current set of pixels within the video display using video information obtained only from the request and the client computer;
  wherein the receiving step includes the step of receiving a motion request to translate a subset of the current set of pixels by a predetermined amount;
  wherein the generating step includes the step of generating a single motion vector for moving the subset within the video display by the predetermined amount;
  identifying gaps in the video display after moving the subset by the predetermined amount;
  retrieving new video information from a server computer containing new video pixels corresponding to the gaps in the video display; and
  wherein the generating step includes the step of replacing the gaps in the video display with the new video pixels.

38. A computer-usable medium embodying computer program code for causing a computer to perform client-assisted motion estimation, comprising the steps of:
  receiving a request from a client computer to update a current set of pixels within a video display;

generating a motion vector for moving the current set of pixels within the video display using video information obtained only from the request and the client computer;

exchanging side information between the client computer and a server computer; and delegating responsibility for executing the receiving and generating steps between the client and server computers in response to the side information.

* * * * *